United States Patent [19]

Fritzsche et al.

[11] Patent Number: 5,097,481

[45] Date of Patent: Mar. 17, 1992

[54] GAS LASER HAVING TWO LONGITUDINAL MODES OF LASER OSCILLATION

[75] Inventors: Helmut Fritzsche, Alling; Hans Krueger, Munich, both of Fed. Rep. of Germany

[73] Assignee: Siemens Aktiengesellschaft, Munich, Fed. Rep. of Germany

[21] Appl. No.: 548,905

[22] PCT Filed: Jan. 19, 1989

[86] PCT No.: PCT/DE89/00024

§ 371 Date: Jul. 19, 1990

§ 102(e) Date: Jul. 19, 1990

[87] PCT Pub. No.: WO89/06872

PCT Pub. Date: Jul. 27, 1989

[30] Foreign Application Priority Data

Jan. 21, 1988 [DE] Fed. Rep. of Germany ....... 3801731

[51] Int. Cl.[5] .......................... H01S 3/08; H01S 3/10
[52] U.S. Cl. ........................ 372/106; 372/99; 372/105
[58] Field of Search .................... 372/105, 106, 99, 55

[56] References Cited

U.S. PATENT DOCUMENTS 3,549,236 12/1970 Mink .................................. 372/105
3,609,585 9/1971 Hufnagel .......................... 331/94.5
4,800,568 1/1989 Krueger et al. .................... 372/99

FOREIGN PATENT DOCUMENTS

3408263C1 5/1985 Fed. Rep. of Germany .
2015812A 9/1979 United Kingdom .
2157484A 10/1985 United Kingdom .

OTHER PUBLICATIONS

Kamprath-Reihe Technik im Vogel-Buchverl. Wurzburg: Prof. Dr.-Ing. Klaus Tradowsky: "Laser", vol. 4, pp. 44, 45, 50, 95 and 96.
No. 58-53875(A) "Semi-Transparent Mirror for Laser and Preparation Thereof", by Michihiko Tominaga, vol. 7, No. 140 (E-182) [1285], Jun. 18, 1983.
2319 Optics Communications, vol. 46 (1983) Jul., No. 3/4, Amsterdam, Netherlands, E. W. Weber et al., "Multi-Mode CW Dye Laser", pp. 231-236.
Journal of the Optical Society of America, vol. 1, No. 3, Jun. 1984, pp. 438 and 439, "Stable Two-Mode Operation of a Continuous-Wave Dye Laser Using a Michelson Mode Selector".

Primary Examiner—James W. Davie
Attorney, Agent, or Firm—Hill, Van Santen, Steadman & Simpson

[57] ABSTRACT

In a gas laser having integrated mirrors wherein two longitudinal modes of the laser oscillation are excited during operation, and wherein the oscillatory planes thereof reside perpendicularly relative to one another, a stabilization of the angular position of the oscillatory planes is achieved in that an optically birefringent element is arranged in the beam path of the optical resonator.

7 Claims, 1 Drawing Sheet

U.S. Patent
Mar. 17, 1992
5,097,481
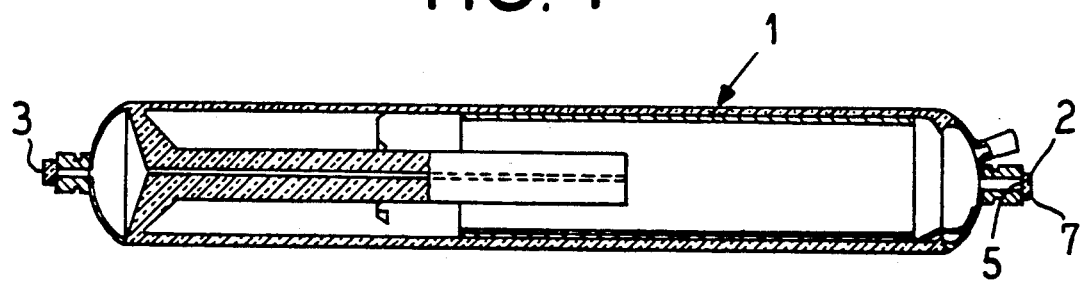
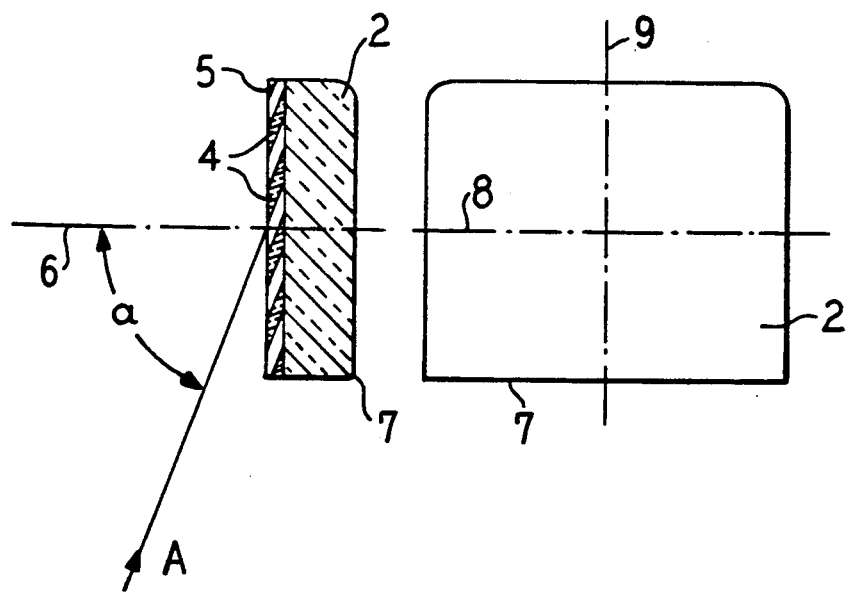

GAS LASER HAVING TWO LONGITUDINAL MODES OF LASER OSCILLATION

BACKGROUND OF THE INVENTION

The present invention is directed to a gas laser comprising an optical resonator formed of two integrated mirrors, more than one longitudinal mode of the laser oscillation being excited therein during operation. Such gas lasers are described, for example, in Klaus Tradowsky "Laser", Vogel-Buchverlag Wuerzburg, 4th Edition, pages 44–45; 50. A laser resonator having more than one longitudinal mode is described on page 44, 45; and a laser having integrated mirrors is described on page 50. The "inner modulation" is described on pages 95–96 and a structure is shown wherein an electro-optical (birefringent) crystal, the modulator, and an analyzer are arranged in the beam path between the resonator mirrors. This, however, proceeds on the basis of a linearly polarized laser beam and the energy thereof is controlled with a phase rotation in the modulator.

When two longitudinal modes oscillating in polarized fashion are excited in the laser, their planes of oscillation being orthogonal to one another, then these laser oscillations tend to vary the angular position of the polarization planes of the longitudinal modes in what are frequently spontaneously occurring rotations around the axis of the laser beam. These rotations are undesired since—for example, for the purpose of a spatial separation of the two modes and for the formation of two coherent laser beams—the polarization planes should retain their angular position relative to a reference plane of the laser housing.

SUMMARY OF THE INVENTION

An object on which the present invention is based is comprised of stabilizing the angular position of the polarization planes of lasers without allowing linear polarization, i.e. without one of the two modes oscillating in directions perpendicular to one another being disturbingly attenuated. This object is achieved by providing a gas laser where spacing of the two mirrors is selected such that two longitudinal modes are excited whose oscillatory planes are perpendicular to one another. A birefringent element is provided for laser emission and which is arranged in a beam path of the optical resonator. The optically birefringent element has two preferred oscillatory planes for linearly polarized light which are perpendicular relative to one another. An anisotropy of the birefringement element is such that a difference between refractive indices of the two preferred oscillatory planes of the birefringement element is no more than 0.3%.

The birefringent element is advantageously a birefringent layer, whereby the layer is arranged on a resonator mirror. It preferably has an optical density of mλ/4. The m is thereby a whole number and is advantageously to be set equal to 1. In this structure, the birefringent layer is very advantageously the uppermost layer of an interference mirror whose layers have two different refractive indices and the birefringent layer has the lower of the two refractive indices. No additional outlay for material and no increased absorption of laser light in the resonator thus occur, linear polarization is avoided, and both modes oscillate with approximately the same strength.

In an advantageous development of the invention, the birefringent layer is a layer vapor-deposited onto the mirror, whereby the deposition direction is inclined by about 50° through 70° relative to the normal onto the mirror surface. It has been shown that column-shaped layer parts are formed on the mirror surface in this structuring, whereby the alignment of the column-shaped layer parts corresponds to the deposition direction. Birefringency is achieved with the layer produced in this way. The recited angular range is thereby critical. For example, given an angle of 80° or more, a polarizing layer that is not birefringent arises.

A helium-neon laser wherein the obliquely vapor-deposited layer is composed of one of the substances $SiO_2$, $TiO_2$, or $Ta_2O_3$, $Al_2O_3$ is thereby preferably suitable for the gas laser. Of these, $SiO_2$ and $Al_2O_3$ are particularly suitable as layers having the lower refractive index.

Particularly suitable for the manufacture of a gas laser of the invention is a method wherein a layer of a material transmissive for the laser emission is vapor-deposited onto the surface of a mirror at an angle of approximately 50° through 70° relative to the surface normal.

The invention shall now be set forth in greater detail with reference to three figures. It is not limited to the example shown in the figures.

BRIEF DESCRIPTION OF THE DRAWINGS

FIG. 1 shows a gas laser having a birefringent element of the invention.

FIGS. 2 and 3 show an inventively coated mirror.

DESCRIPTION OF THE PREFERRED EMBODIMENTS

A laser tube 1 comprises two resonator mirrors 2 and 3. One resonator mirror 2 is coated with a birefringent layer 5. The birefringent layer 5 faces toward the mirror 3 lying opposite and thus lies in the beam path of the optical resonator. The mirror 2 is preferably an interference mirror whose interference layers essentially have two different refractive indices. It is thereby especially recommendable that the birefringent layer 5 is an interference layer and has the lower of the two refractive indices.

The gas laser is dimensioned such that two longitudinal modes of the laser oscillations that neighbor one another in terms of frequency are excited. These neighboring longitudinal modes oscillate in preferred oscillatory planes 8, 9 of the birefringent layer 5 that are perpendicular to one another. The birefringent layer 5 on the mirror 2 has an anisotropy, i.e. a difference of the refractive indices of the two preferred oscillatory planes, of not more than 0.3%, preferably approximately 0.1%. The oscillatory planes 8, 9 are constant with respect to their angular position relative to a reference plane of the laser housing. No disturbing attenuation of one mode due to polarization, however, thereby occurs. The modulation of the laser beam with electro-optical elements is thus significantly simplified. Each mode can be separately modulated without the two modes having a mutual influence on one another. The angular position of the preferred oscillatory planes 8, 9 is advantageously defined by a reference plane that proceeds through an unmistakable, for example ground edge 7 of the mirror 2 and proceeds parallel to the laser beam. The oscillatory planes 8, 9 in the illustrated example are parallel or, respectively, perpendicular to the edge 7 of the mirror 2.

The birefringent layer 5 is advantageously generated by vapor-deposition of a material transmissive for the laser emission onto the mirror. The angle α between the perpendicular on the mirror and the vapor-deposition direction A lies between 50 and 70°. Such a layer contains column-shaped structures 4 that extend in the deposition direction. When the angular range is observed, the layer represents a birefringent layer for the beam incident in the direction of the surface normal 6.

Curved mirror surfaces can also be utilized instead of the illustrated, planar mirror surface. An especially pronounced birefringency is achieved in that the laser is adjusted such that the beam profile lies concentrically in the resonator.

The optical layer thickness of the birefringent layer 5 advantageously lies at m λ/4 when an interference mirror is utilized. In this case, the birefringent layer simultaneously serves as an interference layer of the mirror. Advantageous layer sequences thereby derive when m is equal to 1 or 2. Materials that are standard for interference mirrors are suitable as the material for the birefringent layer, for example the materials $SiO_2$, $TiO_2$, $Ta_1O_3$, or $Al_{p2}O_3$ in the case of a HeNe laser.

We claim:

1. A gas laser, comprising:
   an optical resonator formed of two integrated mirrors, two longitudinal modes of laser oscillation being excited therein during operation;
   a spacing of said mirrors being selected such that said two longitudinal modes which are excited have oscillatory planes which are perpendicular to one another;
   optically birefringent element means for laser emission being arranged in a beam path of said optical resonator;
   said optically birefringement element means having two preferred oscillatory planes for linearly polarized light and which are perpendicular relative to one another; and
   an anisotropy of said birefringent element means being such that a difference between refractive indices of said two preferred oscillatory planes of said birefringent element means is no more than 0.3%.

2. A gas laser according to claim 1 wherein said birefringent element means is a birefringent layer, and said layer being arranged on a resonator mirror.

3. A gas laser according to claim 2 wherein said birefringent layer has an optical density of m λ/4 and serves as an interference layer of said resonator mirror.

4. A gas laser according to claim 2 wherein an interface mirror having layers with two different refractive indices is utilized as said resonator mirror, and said birefringent layer representing an uppermost one of said layers, and said birefringent layer having a lower of said two refractive indices.

5. A gas laser according to claim 2 wherein said birefringent layer is a layer obliquely vapor-deposited onto said resonator mirror, said deposition direction being inclined by about 50° through 70° relative to a normal onto a surface of said mirror, and a perpendicular onto said mirror proceeding parallel to an optical axis of a discharge of said laser.

6. A gas laser according to claim 5 wherein the gas laser comprises a HeNe laser, and said obliquely vapor-deposited layer is composed of one of the substances $SiO_2$ or $Al_2O_3$.

7. A method for manufacturing a gas laser, comprising the steps of:
   providing an optical resonator formed of two integrated mirrors, two longitudinal modes of laser oscillation being excited therein during operation;
   selecting a spacing of said mirrors such that said two longitudinal modes which are excited having oscillatory planes which are perpendicular to one another;
   providing a birefringent element for laser emission arranged in a beam path of said resonator;
   providing said birefringent element such that it has two preferred oscillatory planes for linearly polarizing light that reside perpendicularly relative to one another;
   providing an anisotropy of said birefringent element such that a difference between refractive indices of said two preferred oscillatory planes of the birefringent element is no more than 0.3%; and
   providing said birefringent element by vapor-depositing onto a surface of one of said mirrors at an angle of approximately 50° through 70° relative to a normal to said mirror surface a layer formed of a material transmissive for the laser emission.

* * * * *